United States Patent
Whalen et al.

[11] Patent Number: 6,039,399
[45] Date of Patent: Mar. 21, 2000

[54] LINEAR SEAT RECLINER

[75] Inventors: John F. Whalen, Macomb; David L. Robinson, Sterling Heights, both of Mich.

[73] Assignee: Fisher Dynamics Corporation, St. Clair Shores, Mich.

[21] Appl. No.: 09/146,548

[22] Filed: Sep. 3, 1998

[51] Int. Cl.[7] .............................. B60N 2/20; B60N 2/22
[52] U.S. Cl. ........................ 297/362.12; 297/216.1; 297/363; 384/209
[58] Field of Search ................... 297/361.1, 362.12, 297/363, 375, 216.1; 384/209, 208

[56]  References Cited

U.S. PATENT DOCUMENTS

| | | | |
|---|---|---|---|
| 2,662,557 | 12/1953 | Heim | 384/209 |
| 2,766,079 | 10/1956 | Browne | 384/209 X |
| 4,059,317 | 11/1977 | McCloskey | 384/209 |
| 4,898,424 | 2/1990 | Bell . | |
| 5,033,872 | 7/1991 | Ueno et al. | 384/209 |
| 5,052,752 | 10/1991 | Robinson . | |
| 5,199,764 | 4/1993 | Robinson . | |
| 5,405,200 | 4/1995 | Sumiyoshi et al. | 384/209 |
| 5,660,440 | 8/1997 | Pejathaya . | |
| 5,718,482 | 2/1998 | Robinson . | |
| 5,769,493 | 6/1998 | Pejathaya . | |
| 5,813,725 | 9/1998 | Robinson . | |

*Primary Examiner*—Anthony D. Barfield
*Attorney, Agent, or Firm*—Harness, Dickey & Pierce, P.L.C.

[57]  ABSTRACT

A linear seat recliner adapted to interconnect a seatback to a seat bottom and which is equipped with a recliner rod assembly having a recliner rod and a ball joint mounted in an aperture formed through one end of the recliner rod. The ball joint includes a ball swivel having an arcuate outer surface which is retained within a socket defined by a pair of retainer rings mounted in the rod aperture. The retainer rings rotatably support the ball swivel within the rod aperture to permit relative angular movement therebetween. The ball swivel further includes a throughbore adapted to receive a hinge pin for securing the ball joint end of the recliner rod assembly to corresponding structure of the seatback or seat bottom. Crush ribs are formed in the throughbore of the ball swivel for engaging the hinge pin and establishing an interference fit therebetween.

25 Claims, 3 Drawing Sheets

5,039,399

LINEAR SEAT RECLINER

BACKGROUND OF THE INVENTION

1. Field of the Invention

The present invention relates generally to seats for motor vehicles and, more specifically, to a linear seat recliner having a recliner rod assembly equipped with a ball joint for connection to the seat frame.

2. Description of Background Art

Virtually all motor vehicles are now equipped with seats having a seat bottom, a seatback pivotally secured to the seat bottom, and a recliner mechanism for latching the seatback in a desired use position relative to the seat bottom. The recliner mechanism can be selectively actuated for adjusting the angularity of the seatback relative to the seat bottom through a range of use positions defined between an upright position and a fully-reclined position. One such type of recliner mechanism, referred to as a linear seat recliner, typically includes a housing and an elongated recliner rod having a first end supported from the housing. The housing is adapted to be mounted to the seat bottom frame and the second end of the recliner rod is pivotally secured to a lever arm extension of the seatback frame. A latch assembly normally functions to latch the first end of the recliner rod to the housing. However, upon release of the latch assembly, linear movement of the recliner rod relative to the housing results in angular movement of the seatback relative to the seat bottom.

Conventionally, a hinge pin is mounted in a pair of alignable apertures formed in the second end of the recliner rod and the lever arm extension of the seatback frame so as to permit pivotal movement therebetween. Standard assembly techniques require the outer diameter of the hinge pin to be smaller than the inner diameter of the apertures to accommodate anticipated manufacturing variances and assembly stack-ups. Unfortunately, this can result in a noticeable amount of angular play (i.e., chucking) of the seatback relative to the seat bottom even though the linear seat recliner is latched. It would therefore be desirable to design a linear seat recliner that is capable of providing a closely toleranced connection between the recliner rod and the hinge pin for accommodating typical dimensional variations to eliminate chucking, while at the same time maintaining rotational freedom so as to permit smooth reclining motion of the seatback.

SUMMARY OF THE INVENTION

In a preferred embodiment, the present invention is directed to a linear seat recliner adapted to interconnect a seatback to a seat bottom and which is equipped with a recliner rod assembly having a recliner rod and a ball joint mounted in an aperture formed through one end of the recliner rod. The ball joint includes a ball swivel having an arcuate outer surface which is retained within a socket defined by a retainer that is mounted in the rod aperture. The retainer rotatably supports the ball swivel within the rod aperture to permit relative angular movement therebetween. The ball swivel further includes a throughbore adapted to receive a hinge pin for securing the ball joint end of the recliner rod assembly to corresponding structure of the seatback or seat bottom.

As an optimal feature, the ball swivel can have a plurality of crush ribs formed in its throughbore to provide an interference fit between the hinge pin and the ball joint.

Accordingly, it is an object of the present invention to provide a linear seat recliner having a recliner rod assembly comprised of a recliner rod and a ball joint.

A further object of the present invention is to provide a recliner rod assembly which is adapted to accommodate any misalignment between the mounting holes for a linear seat recliner and the pivotal connection between the recliner rod and the seatback or seat bottom.

It is yet another object of the present invention to provide a press fit between the hinge pin and the ball joint during the assembly process to eliminate chucking of the seatback relative to the seat bottom.

It is an additional object of the present invention a linear seat recliner which efficiently transfers torque from the seatback into the seat bottom frame without adversely loading the linear recliner, particularly in an all-belts-to-seats type vehicle seat.

BRIEF DESCRIPTION OF THE DRAWINGS

These and other objects, advantages and features of the present invention will become apparent from the following description and appended claims, taken in conjunction with the accompanying drawings, wherein:

DETAILED DESCRIPTION OF THE INVENTION

Figure 1:
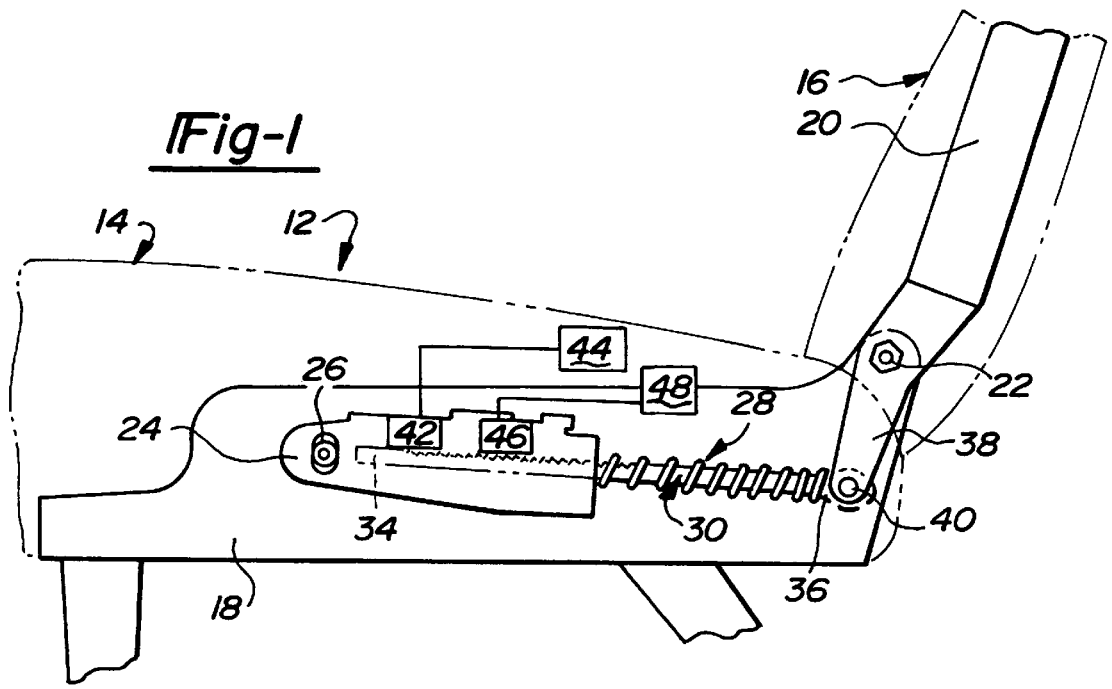
FIG. 1 is a side elevational view of a vehicle seat showing the linear seat recliner of the present invention located along an outer edge of the seat frame.

In general, the present invention relates to a linear seat recliner 10 of the type shown in FIG. 1 which is adapted for use with a seat assembly 12 having an upholstered seat bottom 14 and an upholstered seatback 16. While not limited thereto, seat assembly 12 is of a type contemplated for use as the front seat of a motor vehicle. For example, seat assembly 12 can be of the "all belts to seat" type (i.e., stand alone structural seats). Seat assembly 12 has an underlying frame structure including a pair of lateral side rails 18 which support seat bottom 14 and a pair of lateral support rails 20 which support seatback 16. Lateral support rails 20 are pivotally coupled at pivots 22 to lateral side rails 18. As such, seatback 16 is supported for angular movement relative to seat bottom 14. However, those skilled in the art will appreciate that the particular construction of seat assembly 12 is not critical to the novelty of the present invention since it is contemplated that linear seat recliner 10 can be installed in virtually any seat application where reclining and/or forward dumping of seatback 16 is required.

Linear seat recliner 10 includes a housing 24 that is adapted to be secured to one of lateral side rails 18 by a trunion 26. Linear seat recliner 10 further includes a recliner rod assembly 28 comprised of an elongated recliner rod 30 and a ball joint 32. Recliner rod 30 has a first end 34 supported by housing 24 for linear movement relative thereto, and a second end 36 pivotally coupled to a lever arm 38 extending downwardly from one of lateral support rails 20 by a hinge pin 40. In general, linear seat recliner 10 is operable for permitting selective adjustment of the angularity of seatback 16 relative to seat bottom 14 through a range of "use" positions defined between an upright position and a fully-reclined positions. As a further option, linear seat recliner 10 may be operable to permit seatback 16 to be folded to a forward dumped position to provide greater access to the area located behind seat assembly 12.

Linear seat recliner 10 is schematically shown to include a latching mechanism 42 operable for releasably latching first end 34 of recliner rod 30 to housing 24. Latching mechanism 42 is normally operable in a locked mode to prevent movement of first end 34 of recliner rod 30 relative to housing 24 for securing seatback 16 in a desired use position. Latching mechanism 42 is further operable in a released mode to release first end 34 of recliner rod 30 for linear movement relative to housing 24, thereby permitting adjustment of the use position of seatback 16. A recline actuator mechanism 44 is provided to permit a seat occupant to selectively shift latching mechanism 42 from its locked mode into its released mode when it is desired to adjust the seatback use position. An exemplary linear seat recliner having a suitable latching mechanism is disclosed in commonly-owned U.S. Pat. No. 4,898,424 entitled "Linear Recliner". Linear seat recliner 10 may further include a memory dump mechanism 46 for causing latching mechanism 42 to release seatback 16 for pivotal movement from its use position to its forward dumped position and then automatically re-latch seatback 16 in its previous use position, and a dump actuator mechanism 48 for controlling actuation of memory dump mechanism 46. A linear seat recliner having such an arrangement is disclosed in commonly-owned U.S. Pat. No. 5,769,493 entitled "Linear Recliner With Easy Entry Memory Feature". The foregoing patents are expressly incorporated by reference herein.

While shown with housing 24 mounted to seat bottom 14, those skilled in the art will appreciate that linear seat recliner 10 can alternatively be located in seatback 16 of seat assembly 12. Specifically, housing 24 can be mounted to one of support rails 20 with second end 36 of recliner rod 30 attached to seat bottom frame 18 at a pivot point located rearwardly of hinge pin 22. In all other aspects, linear seat recliner 10 operates in the same manner regardless of its mounting location in seat bottom 14 or seatback 16.

The present invention is specifically directed to providing linear seat recliner 10 with a mechanism for accommodating misalignment between housing 24 and side rail 18 as well as between recliner rod 30 and lever arm 38 when linear seat recliner 10 is installed on seat assembly 12. In this regard, recliner rod assembly 28 includes recliner rod 30 and ball joint 32 which is adapted to be positioned and retained in an aperture 50 formed in second end 36 of recliner rod 30. As will be detailed, ball joint 32 is adapted to accept and establish a press fit connection with hinge pin 40 for pivotally connecting second end 36 of recliner rod 30 to lever arm 38. Ball joint 32 includes a ball swivel 52 and a retainer 53 for supporting ball swivel 52. Ball swivel 52 has an arcuate outer surface 56 which is truncated on opposite sides to define a pair of planar end surfaces 58. A right cylindrical throughbore 60 extends through ball swivel 52 and communicates with end surfaces 58. In accordance with the embodiment shown, retainer 53 is preferably defined by a pair of retainer rings 54. Each retainer ring 54 has a sleeve segment 62 and a flange segment 64 which together define an arcuate inner surface 66 that is sized to surround and encapsulate a complimentary portion of outer surface 56 on ball swivel 52. Preferably, arcuate outer surface 56 of ball swivel and arcuate inner surface 66 of each retainer ring 54 are spherical. Moreover, sleeve segment 62 of each retainer ring 54 has an outer surface 68 that is adapted to be press fit into aperture 50 in second end 36 of recliner rod 30.

Figure 2:
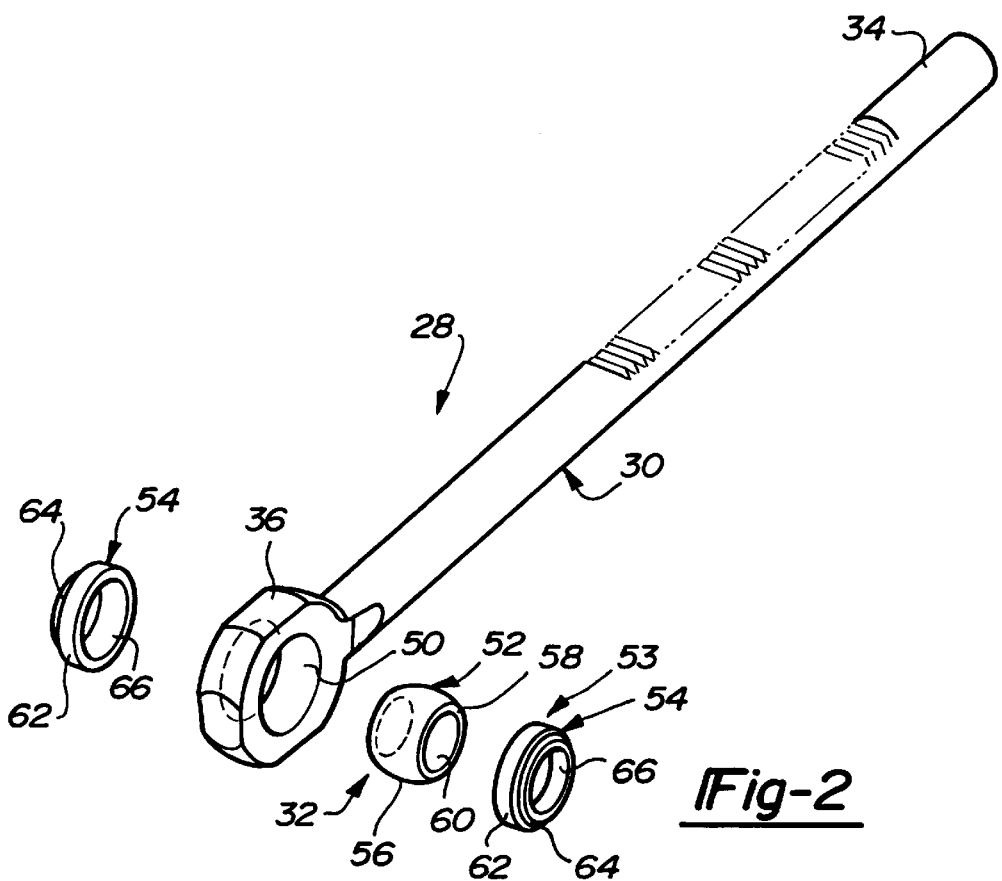
FIG. 2 is an exploded perspective view of a recliner rod assembly utilized in conjunction with the linear seat recliner shown in FIG. 1.
Figure 3:
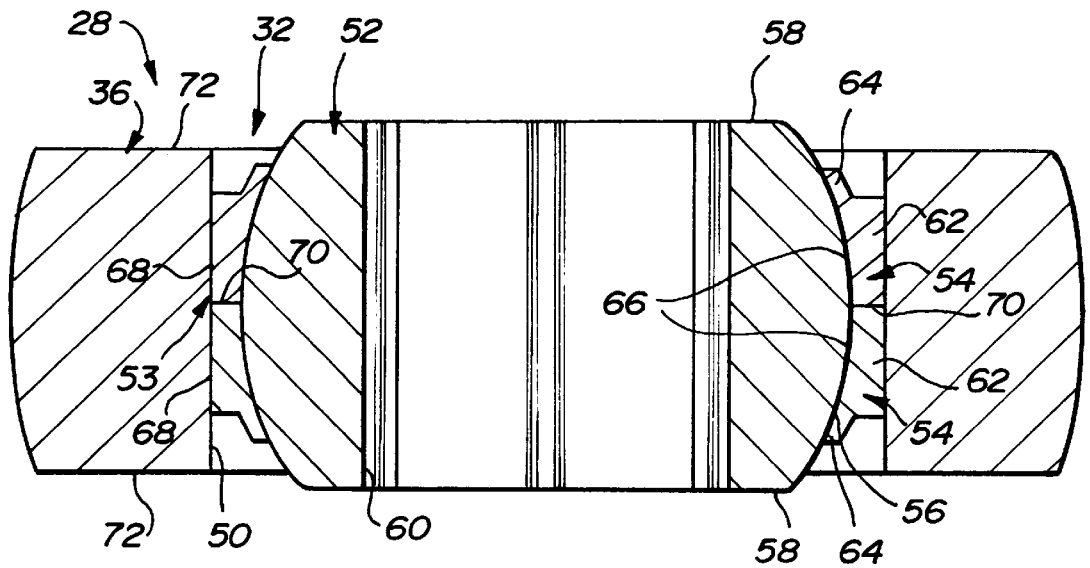
FIGS. 3 and 4 are sectional views of an end portion of the recliner rod assembly shown in FIG. 2.
Figure 4:
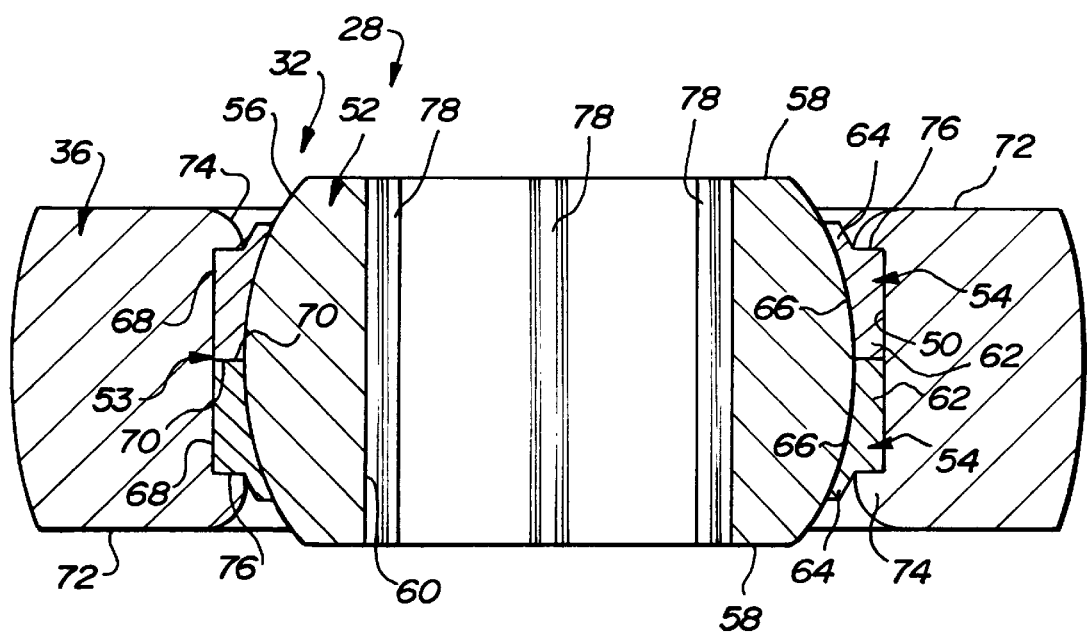

As best seen from FIGS. 2 and 3, retainer rings 54 are initially installed on opposite sides of ball swivel 52 and then ball joint 32 is inserted into aperture 50 with rear face surfaces 70 of retainer rings 54 in facing orientation and, preferably, in mating engagement. Alternatively, ball swivel 52 can be initially inserted into aperture 50 and retainer rings 54 can then be inserted into opposite sides of aperture 50 to capture ball swivel 52. Regardless of the assembly method, once ball joint 32 is installed in aperture 50, portions of sidewalls 72 adjacent the opposite peripheral edges of aperture 50 are deformed. As shown in FIG. 4, such deformation establishes retaining flanges 74 that engage a transition surfaces 76 between sleeve segment 62 and flange segment 64 of each retainer ring 54. Retaining flanges 74 may be continuous or, in the alternative, may be segmented so as to define a series of circumferentially spaced tabs or lugs. In either case, retaining flanges 74 are created using any suitable cold deforming (i.e., staking, swaging, etc.) process or operation for permanently securing ball joint 32 to second end 36 of recliner rod 30. With ball joint 32 secured to second end 36 of recliner rod 30, inner surfaces 66 of retainer rings 54 work cooperatively to cumulatively define a socket within which ball swivel 52 is retained and which functions to accommodate angular movement of ball swivel 52 relative to recliner rod 30.

Figures 5, 6:
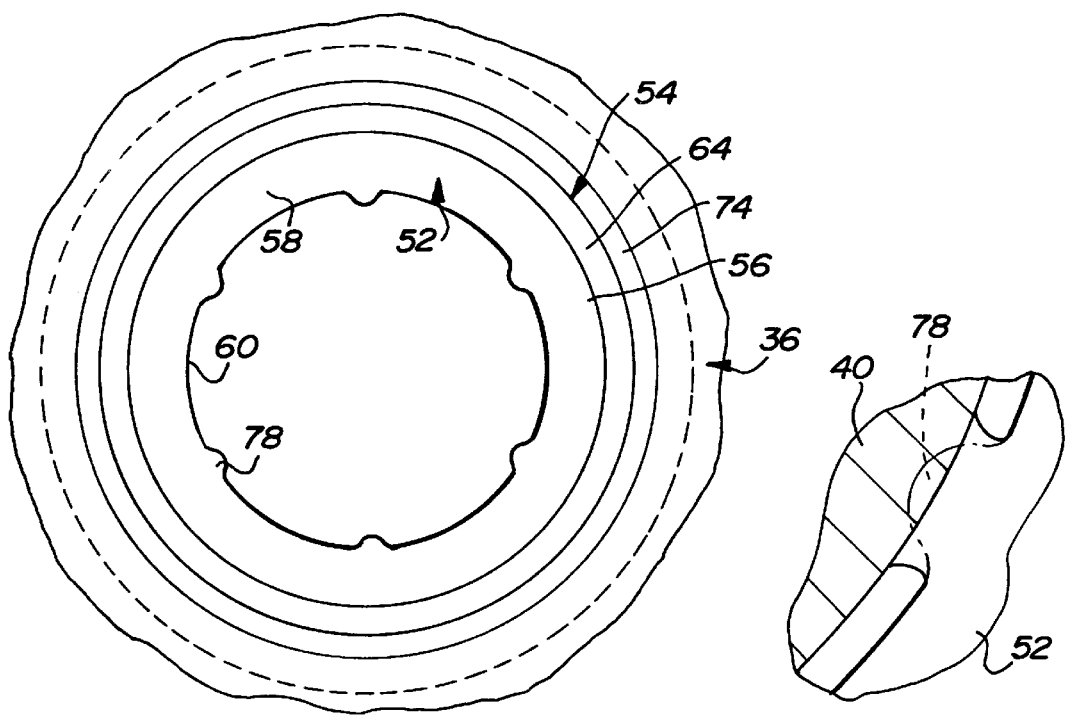
FIG. 5 is an enlarged partial side view of the end portion of the recliner rod assembly.
FIG. 6 is an enlarged partial section view of a crush rib formed on an inner surface of the ball swivel which provides a press fit connection with the hinge pin.

According to another feature of the present invention, a plurality of crush ribs 78 are formed on the inner wall surface of throughbore 60 in ball swivel 52. As presently preferred, crush ribs 78 extend longitudinally and are circumferentially spaced equidistantly around throughbore 60. Each crush rib 78 extends radially inwardly and is dimensioned so as to provide an interference fit between ball swivel 52 and hinge pin 40 when hinge pin 40 is installed in throughbore 60. In this manner, crush ribs 78 provide a locally reduced diameter, in the range of approximately one to five percent (1%–5%) reduction, relative to the outer diameter of hinge pin 40, so as to provide a press fit connection between hinge pin 40 and portions of the inner wall surface of ball swivel 52 when assembled. More specifically, with reference to FIG. 6, as hinge pin 40 is inserted within throughbore 60, crush ribs 78 are deformed (from the undeformed condition illustrated in phantom lines) to rigidly capture and secure hinge pin 40 to ball swivel 52. While crush ribs 78 are shown to extend in a longitudinal orientation, other arrangements (i.e., helical, circumferential, etc.), or combinations thereof, could be utilized.

In a preferred embodiment, ball swivel 52 is made using a powdered metal process allowing for crush ribs 78 having the necessary geometry and ductility to be formed on the inner surface of throughbore 66. In the above-described application, the use of six crush ribs 78, which are spaced equidistantly around throughbore 60, has been found to provide an adequate press fit connection for eliminating chucking at ball joint 32. Likewise, a suitable plastic material, such as a nylon-based resin material, can be utilized for retainer rings 54 to prevent pull-out from recliner rod 30 while still facilitating relative rotation of ball swivel 52 relative to recliner rod 30. As a contemplated option, the pair of retainer rings 54 could be manufactured as a single-piece retainer component defining the socket within which ball swivel 52 is retained.

Figure 7:
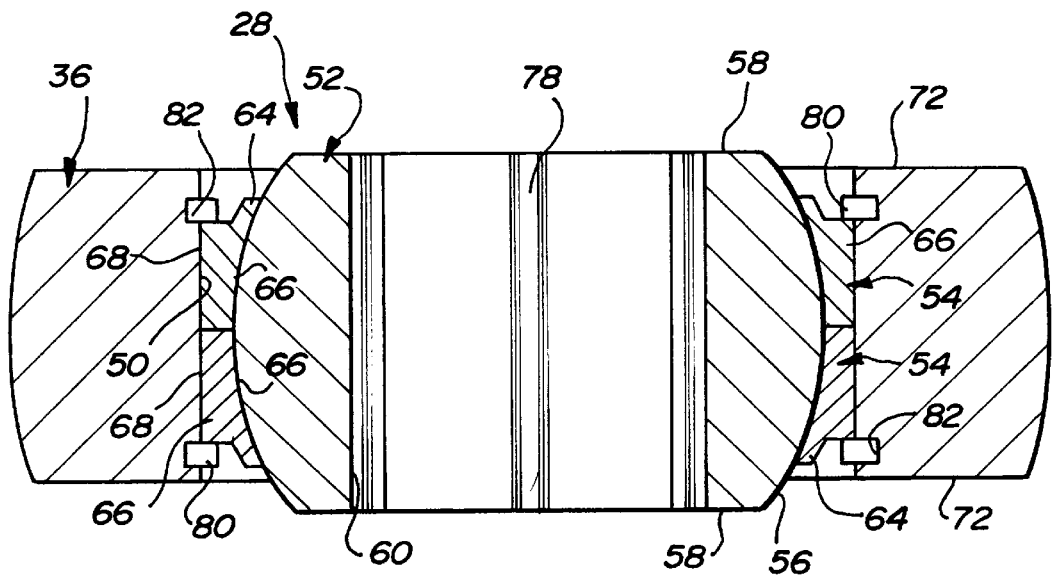
FIG. 7 is a sectional view of an end portion of a recliner rod assembly according to an alternative embodiment of the present invention.

Referring now to FIG. 7, a modified arrangement for securing ball joint 32 in aperture 50 of recliner rod 30 is shown. In particular, flanges 74 formed by cold deforming sidewalls 72 have been replaced by a pair of snap rings 80 mounted in circumferential grooves 82 formed in the ends of rod aperture 50.

From the foregoing detailed description, one skilled in the art will readily recognize that the present invention provides an improved recliner rod assembly 38 for use in linear recliner 10, thereby eliminating any misalignment in mounting holes for linear recliner 10 and efficiently transferring the loading and/or torque on seatback 16 to seat bottom 14 without adversely loading linear recliner 10. This load transfer arrangement is particularly advantageous in an all-belt-to-seat application. Moreover, ball joint 32, as utilized in recliner rod assembly 28, incorporates a plurality of crush ribs 78 which provides a press-fit between hinge pin 40 and ball swivel 52 to eliminate chucking at the hinged connection.

While the present invention has been disclosed by describing and illustrating exemplary embodiments, those skilled in the art will readily recognize from the foregoing discussion and the accompanying drawings and claims that various changes, modifications and variations can be made therein without departing from the spirit and scope of the invention as defined in the following claims.

What is claimed is:

1. In a linear seat recliner for use in a seat assembly to selectively position a seatback with respect to a seat bottom, the linear seat recliner having a housing adapted to be secured to one of the seatback and the seat bottom and a recliner rod having a first end supported by the housing and a second end adapted to be secured to the other of the seatback and the seat bottom, the improvement comprising a ball joint disposed within an aperture formed in the second end of the recliner rod, said ball joint including a retainer defining a socket and a ball swivel rotatably supported in said socket and defining a throughbore adapted to receive a hinge pin for securing the second end of the recliner rod to the seatback or the seat bottom, said retainer having a smooth planar outer circumferential face slidably positionable within said aperture to permit axial movement of said retainer within said aperture and an annular abutment face between said outer circumferential face and said socket, wherein said recliner rod includes a flange on said second end and extending into said aperture for engaging said planar annular abutment face of the retainer to fixedly position the retainer within the aperture preventing said axial movement within said aperture.

2. The linear seat recliner of claim 1 wherein said socket is defined by an arcuate inner surface of said retainer, and wherein said ball swivel has an arcuate outer surface engaging said arcuate inner surface of said retainer.

3. The linear seat recliner of claim 2 wherein said retainer has an outer surface adapted to engage an inner surface of said aperture, and wherein portions of said second end of said recliner rod adjacent to ends of said aperture are deformed to define said flange and secure said retainer in said aperture.

4. The linear seat recliner of claim 3 wherein said deformed portions define continuous flanges that engage said retainer.

5. The linear seat recliner of claim 3 wherein said deformed portions defining said flange further includes a series of lugs that engage said retainer.

6. The linear seat recliner of claim 2 wherein said retainer has an outer surface adapted to engage an inner surface of said aperture, and wherein circumferential grooves are formed in opposite ends of said aperture to receive snap rings, said snap rings defining said flange for securing said retainer within said aperture.

7. The linear seat recliner of claim 2 wherein said retainer is a pair of retainer rings arranged to encapsulate said ball swivel, and wherein each retainer ring has an outer surface adapted to engage an inner surface of said aperture, and wherein portions of said second end of said recliner rod adjacent to ends of said aperture are deformed to define said flange and secure said retainer rings in said aperture.

8. The linear seat recliner of claim 7 wherein said deformed portions define continuous flanges that engage said retainer rings.

9. The linear seat recliner of claim 7 wherein said deformed portions defining said flange further includes a series of lugs that engage said retainer rings.

10. The linear seat recliner of claim 1 wherein said throughbore in said ball swivel includes a crush rib adapted to deform in response to engagement with an outer surface of said hinge pin to provide an interference fit therebetween.

11. The linear seat recliner of claim 10 further comprises a plurality of longitudinal crush ribs formed on an inner surface of said throughbore.

12. A reclining seat assembly comprising:
   a seat bottom having a side rail;
   a seatback having a support rail pivotally coupled to said side rail;
   a liner seat recliner including a housing secured to one of said side rail and said support rail, a recliner rod having a first end supported for relative linear motion within said housing, and a ball joint disposed within an aperture formed in a second end of said recliner rod, said ball joint including a retainer secured within said aperture and defining a socket, and a swivel member mounted in said socket of said retainer for angular movement relative to said aperture; and
   a hinge pin extending through a throughbore formed in said swivel member for coupling said second end of said recliner rod to the other of said side rail and said support rail, wherein said throughbore in said swivel member includes a crush rib adapted to deform in response to engagement with an outer surface of said hinge pin to provide an interference fit therebetween.

13. The reclining seat assembly of claim 12 wherein said socket is defined by an arcuate inner surface of said retainer, wherein said swivel member has an arcuate outer surface which engages said arcuate inner surface of said retainer, wherein the second end of the recliner rod includes a flange adjacent to ends of said aperture, extending into said aperture, and engaging an abutment face of the retainer to secure said ball joint to said second end of said recliner rod and against axial movement within said aperture.

14. The reclining seat assembly of claim 13 wherein said retainer has an outer surface adapted to engage an inner surface of said aperture, and wherein portions of said second end of said recliner rod adjacent to ends of said aperture are deformed to define said flange and secure said retainer in said aperture.

15. The reclining seat assembly of claim 14 wherein said deformed portions define continuous flanges that engage said retainer.

16. The reclining seat assembly of claim 14 wherein said deformed portions defining said flange further includes a series of lugs that engage said retainer.

17. The reclining seat assembly of claim 13 wherein said retainer has an outer surface adapted to engage an inner surface of said aperture, and wherein circumferential grooves are formed in opposite ends of said aperture which receive snap rings, said snap rings defining said flange for securing said retainer within said aperture.

18. The reclining seat assembly of claim 13 wherein said retainer is a pair of retainer rings arranged to encapsulate said swivel member, and wherein each retainer ring has an outer surface adapted to engage an inner surface of said aperture, and wherein portions of said second end of said recliner rod adjacent to ends of said aperture are deformed to define said flange and secure said retainer rings in said aperture.

19. The reclining seat assembly of claim 18 wherein said deformed portions define continuous flanges that engage said retainer rings.

20. The reclining seat assembly of claim 18 wherein said deformed portions defining said flange further includes a series of lugs that engage said retainer rings.

21. The reclining seat assembly of claim 12 further comprises a plurality of longitudinal crush ribs formed on an inner surface of said throughbore.

22. In a linear seat recliner for use in a seat assembly to selectively position a seatback with respect to a seat bottom, the linear seat recliner having a housing adapted to be secured to one of the seatback and the seat bottom and a recliner rod having a first end supported by the housing and a second end adapted to be secured to the other of the seatback and the seat bottom, the improvement comprising a ball joint disposed within an aperture formed in the second end of the recliner rod, said ball joint including a retainer secured in said aperture and defining a socket, and a ball swivel rotatably supported in said socket and defining a throughbore adapted to receive a hinge pin for securing the second end of the recliner rod to the seatback or the seat bottom, wherein said throughbore in said ball swivel includes a crush rib adapted to deform in response to engagement with an outer surface of said hinge pin to provide an interference fit therebetween.

23. The linear seat recliner of claim 22 further comprises a plurality of longitudinal crush ribs formed on an inner surface of said throughbore.

24. The linear seat recliner of claim 23 wherein said longitudinal crush ribs are circumferentially spaced equidistantly around said throughbore.

25. The linear seat recliner of claim 23 wherein said crushed ribs provide a locally reduced diameter in said throughbore relative to an outer diameter of the hinge pin in the range of approximately one to five percent (1%–5%) reduction.

* * * * *